(12) United States Patent
He

(10) Patent No.: US 12,016,074 B2
(45) Date of Patent: Jun. 18, 2024

(54) UE ASSISTED FAST TRANSITION BETWEEN RRC STATES

(71) Applicant: QUALCOMM Incorporated, San Diego, CA (US)

(72) Inventor: Linhai He, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 26 days.

(21) Appl. No.: 16/904,427

(22) Filed: Jun. 17, 2020

(65) Prior Publication Data

US 2020/0413476 A1 Dec. 31, 2020

Related U.S. Application Data

(60) Provisional application No. 62/868,766, filed on Jun. 28, 2019.

(51) Int. Cl.
*H04W 76/30* (2018.01)
*H04W 28/02* (2009.01)
(Continued)

(52) U.S. Cl.
CPC ....... *H04W 76/30* (2018.02); *H04W 28/0278* (2013.01); *H04W 76/27* (2018.02); *H04W 80/02* (2013.01)

(58) Field of Classification Search
CPC . H04W 76/30; H04W 80/02; H04W 28/0278; H04W 76/27; H04W 52/0251; H04W 52/028; Y02D 30/70
See application file for complete search history.

(56) References Cited

U.S. PATENT DOCUMENTS 11,683,681 B2 6/2023 Liu et al.
2016/0234877 A1* 8/2016 Bangolae ............... H04W 4/70
(Continued)

FOREIGN PATENT DOCUMENTS

CN 101426278 A 5/2009
CN 104137612 A 11/2014
(Continued)

OTHER PUBLICATIONS

3GPP TSG-RAN WG2 Meeting#105bis, R2-1903620, Xi'an, China, Apr. 8-12, 2019, Source: ZTE; Title: Efficient transition from RRC_Connected to RRC_Idle/RRC_Inactive (Year: 2019).*
(Continued)

*Primary Examiner* — Mohammed S Chowdhury
(74) *Attorney, Agent, or Firm* — ArentFox Schiff LLP

(57) ABSTRACT

UEs may want to switch to the RRC idle state or to the RRC inactive state sooner than the expiration of the timer or without having to wait for the network to release the RRC connection. Allowing the UE to increase the rate at which it transitions to RRC idle state or RRC inactive state may allow the UE to reduce power consumption, as well as reduce signaling resources. The apparatus determines a preference between a transition to an RRC inactive state or to an RRC idle state when an RRC connection is released. The apparatus sends, to a base station, an RRC state preference indication of the preference for transitioning upon release of the RRC connection from the RRC connected state to one of the RRC inactive state or to the RRC idle state.

20 Claims, 8 Drawing Sheets

(51) Int. Cl.
*H04W 76/27* (2018.01)
*H04W 80/02* (2009.01)

(56) References Cited

U.S. PATENT DOCUMENTS

| | | | | |
|---|---|---|---|---|
| 2017/0013557 | A1* | 1/2017 | Koc | H04W 4/70 |
| 2018/0103460 | A1* | 4/2018 | Sharma | H04W 72/14 |
| 2019/0053324 | A1* | 2/2019 | Tseng | H04W 76/30 |
| 2019/0098596 | A1 | 3/2019 | Basu Mallick et al. | |
| 2019/0200414 | A1 | 6/2019 | Abraham et al. | |
| 2019/0254104 | A1* | 8/2019 | Gurumoorthy | H04W 76/27 |
| 2020/0187245 | A1* | 6/2020 | Fujishiro | H04W 74/0833 |
| 2020/0187291 | A1* | 6/2020 | Sha | H04W 76/34 |
| 2020/0260377 | A1* | 8/2020 | Jin | H04W 52/0216 |
| 2020/0314947 | A1* | 10/2020 | Latheef | H04W 76/27 |
| 2020/0351744 | A1* | 11/2020 | Latheef | H04W 24/08 |
| 2020/0374968 | A1* | 11/2020 | Sun | H04W 76/30 |
| 2021/0195405 | A1* | 6/2021 | Gurumoorthy | H04W 48/10 |
| 2022/0086945 | A1* | 3/2022 | Fujishiro | H04W 76/30 |

FOREIGN PATENT DOCUMENTS

| | | |
|---|---|---|
| CN | 106793169 B | 4/2019 |
| EP | 2061192 A1 | 5/2009 |
| EP | 3454623 A1 | 3/2019 |
| WO | 2020043211 A1 | 3/2020 |

OTHER PUBLICATIONS

3GPP TSG-RAN2 Meeting #106; Reno, USA, May 13-17, 2019, R2-1906604; Source: Ericsson, 3GPP_ R2-1906604 ; Title: Efficient transition to Idle and Inactive mode. (Year: 2019).*

3GPP TSG-RAN WG2 Meeting#106; R2-1906270, Source: ZTE Corporation, Title: Further consideration on efficient transition from RRC_Connected to RRC_Inactive or RRC_Idle, Reno, USA, May 13-17, 2019. (Year: 2019).*

3GPP TSG-RAN WG2 Meeting #105bis ; R2-1903119; Source: CATT; Title: Efficient Transition from RRC_Connected to RRC_Idle/RRC_Inactive, Xi'an, China, Apr. 8-Apr. 12, 2019. (Year: 2019).*

3GPP TSG-RAN WG2 #106; R2-1906655 , Source: Kyocera, Title: Network-controlled conditional RRC release, Reno, USA, May 13-17, 2019. (Year: 2019).*

International Search Report and Written Opinion—PCT/US2020/038539—ISAEPO—dated Oct. 9, 2020 (193399WO).

Taiwan Search Report—TW109120566—TIPO—dated Nov. 7, 2023 (193399TW).

* cited by examiner

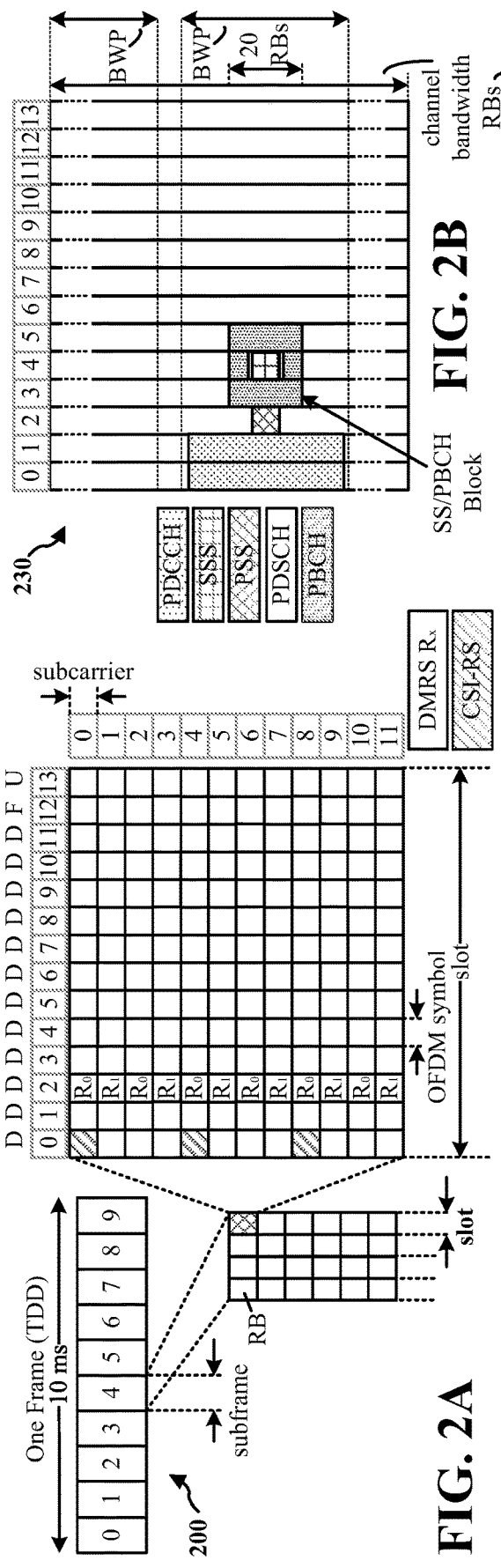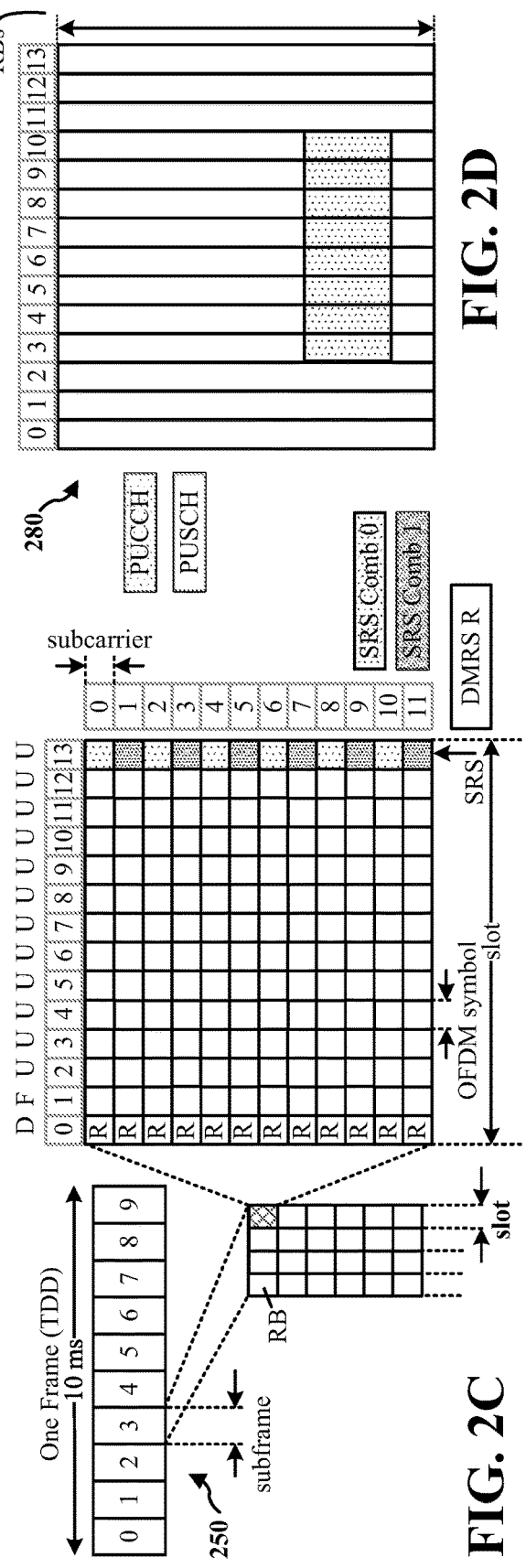

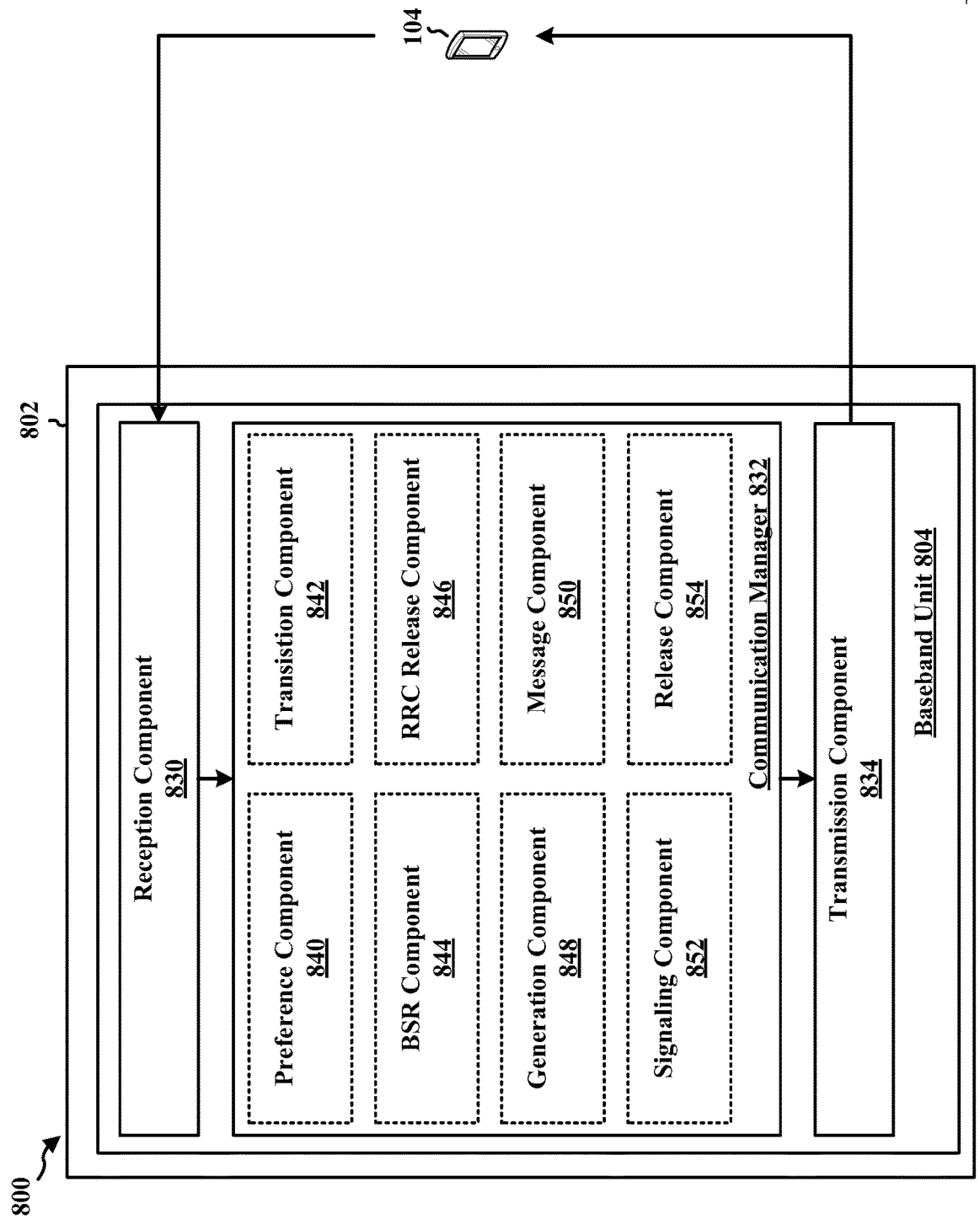

UE ASSISTED FAST TRANSITION BETWEEN RRC STATES

CROSS REFERENCE TO RELATED APPLICATION(S)

This application claims the benefit of U.S. Provisional Application Ser. No. 62/868,766, entitled "UE Assisted Fast Transition Between RRC States" and filed on Jun. 28, 2019, which is expressly incorporated by reference herein in its entirety.

BACKGROUND

Technical Field

The present disclosure relates generally to communication systems, and more particularly, to User Equipment (UE) assisted transition between radio resource control (RRC) states.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In wireless communications, base stations and UEs send different notification and paging signals to each other in order to facilitate communication. These signals can help to improve the overall communication system information, as well as to improve the access and control of each device within the wireless system. In NR, for example, the radio resource control (RRC) protocol may be used for connection establishment between a UE and a network (e.g., base station) and release of such connection. RRC in NR includes three states in which the UE may be in, such as, RRC connected, RRC idle, and RRC inactive. The transition between the RRC idle state to the RRC connected state may take more time and more exchanges of messages and/or signaling between the UE and the base station to complete. The transition between RRC inactive state and RRC connected state may be faster than the transition between RRC idle state and RRC connected state, but requires the network to expend considerable resources.

The present disclosure allows a UE to assist in its transition to a different RRC state when the RRC connection is released, such that the UE may optimize their transition from RRC connected to either the RRC idle state or RRC inactive state, which may reduce the amount of resources that the base station needs to release the RRC connection. The UE may indicate to the base station its preferred RRC state to transition to when releasing the RRC connection, which may reduce the power consumption of the UE.

In an aspect of the disclosure, a method, a computer-readable medium, and an apparatus are provided. The apparatus determines a preference between a transition to an RRC inactive state or to an RRC idle state when an RRC connection is released. The apparatus sends to a base station an RRC state preference indication of the preference for transitioning upon release of the RRC connection from the RRC connected state to one of the RRC inactive state or to the RRC idle state.

In another aspect of the disclosure, a method, a computer-readable medium, and an apparatus are provided. The apparatus receives, from a UE, an RRC state preference indication for a transition from an RRC connected state to an RRC inactive state or to an RRC idle state when the RRC connection is released. The apparatus determines, based on the received RRC state preference indication, whether to transition the UE from the RRC connected state to the RRC inactive state or to the RRC idle state. The apparatus sends an RRC release message to the UE to release the UE from the RRC connected state to one of the RRC inactive state or the RRC idle state.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 8 is a diagram illustrating an example of a hardware implementation for an apparatus employing a processing system.

DETAILED DESCRIPTION

Figure 1:
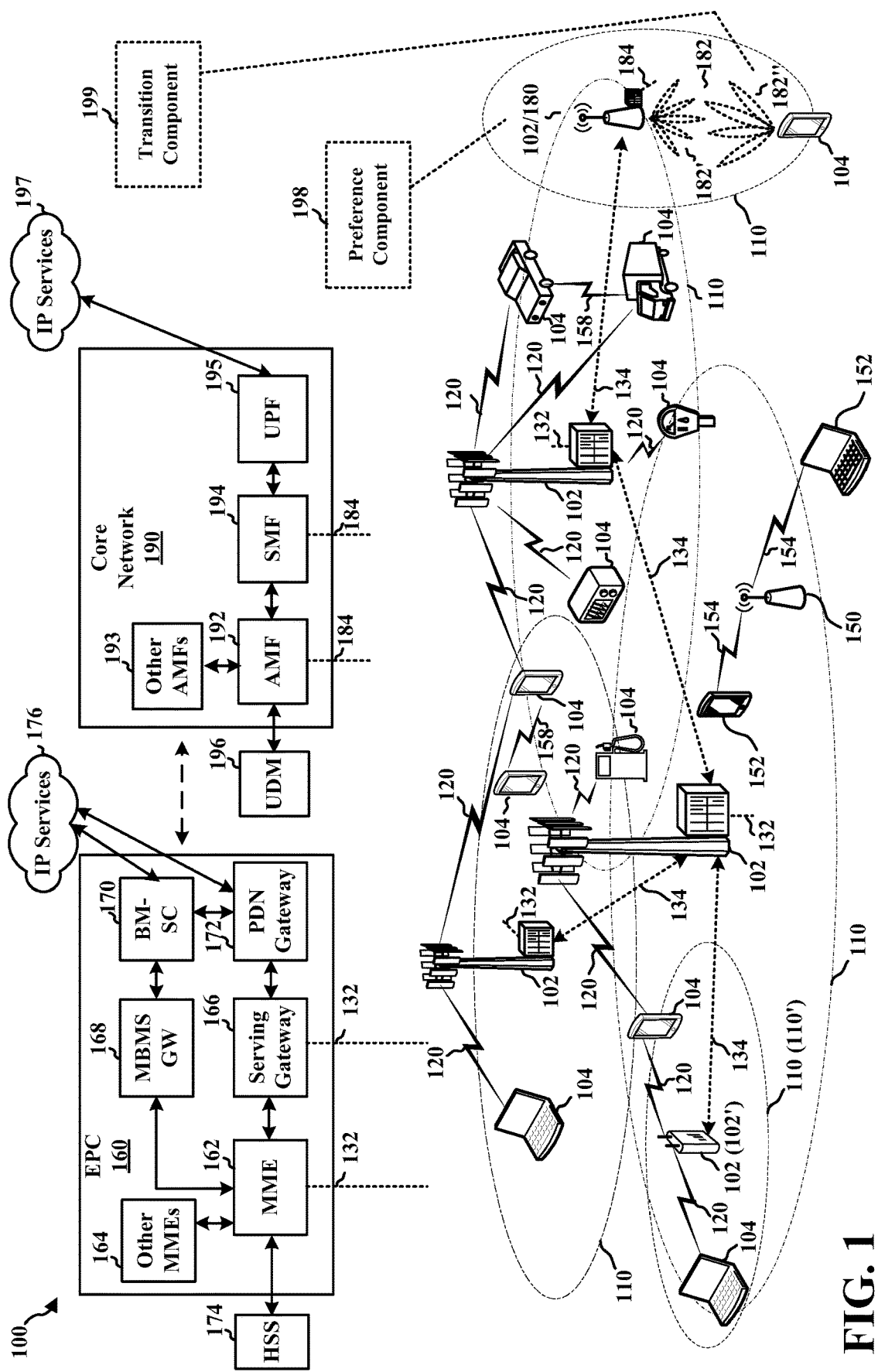
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5 GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Frequency range bands include frequency range 1 (FR1), which includes frequency bands below 7.225 GHz, and frequency range 2 (FR2), which includes frequency bands above 24.250 GHz. Communications using the mmW/near mmW radio frequency (RF) band (e.g., 3 GHz-300 GHz) has extremely high path loss and a short range. Base stations/UEs may operate within one or more frequency range bands. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a preference component 198 configured to determine a preference between a transition to an RRC inactive state or to an RRC idle state when an RRC connection is released. The UE 104 may be configured to send an RRC state preference indication of the preference for transitioning upon release of the RRC connection. The UE may assist the network in releasing the RRC connection which may allow the UE to reduce power consumption by not having to maintain the connection and continue monitoring the connection for signals from the base station.

Referring again to FIG. 1, in certain aspects, the base station 102 may include a transition component 199 configured to determine whether to transition a UE from the RRC connected state to the RRC inactive state or to the RRC idle state. The base station may determine whether to transition the UE to the RRC inactive state or to the RRC idle state based on the RRC state preference indication received from the UE. The base station 102 may send an RRC release message to the UE to release the UE from the RRC connected state to one of the RRC inactive state or the RRC idle state. The base station may be configured to operate in accordance with the RRC state preference indication sent from the UE and transition the UE to the preferred RRC state as indicated by the UE. This allows the UE to reduce signaling overhead when the RRC connection is being released.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
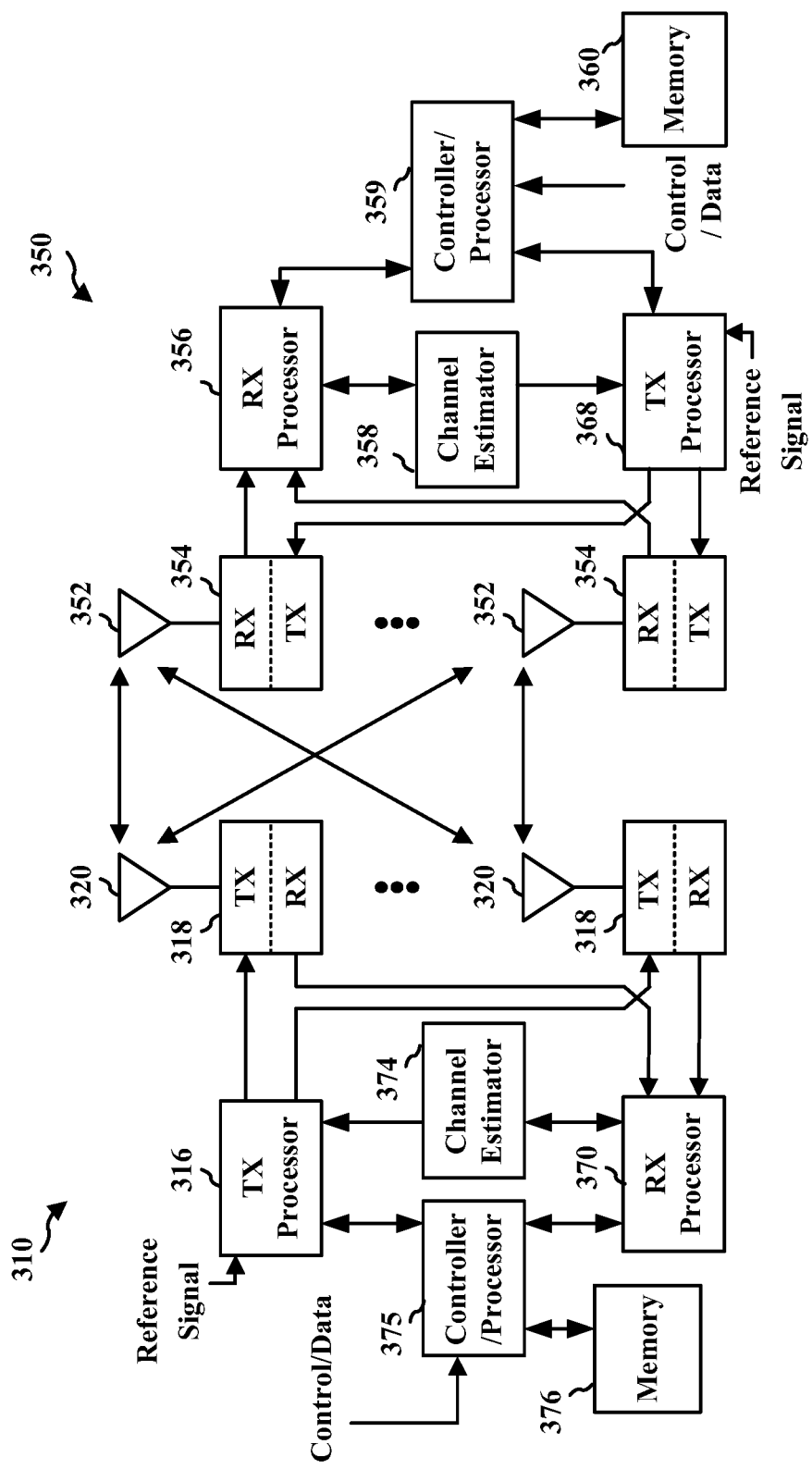
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

In wireless communications, base stations and UEs send different notification and paging signals to each other in order to facilitate communication. These signals can help to improve the overall communication system information, as well as to improve the access and control of each device within the wireless system. In NR, for example, the radio resource control (RRC) protocol may be used for connection establishment between a UE and a network (e.g., base station) and release of such connection. RRC in NR includes three states in which the UE may be in, such as, RRC connected, RRC idle, and RRC inactive. RRC connected state is when the UE is actively connected to the network. RRC idle state, the UE does not have an access stratum (AS) context. As such, the UE, when in the RRC idle state, needs to re-establish the AS context when changing from the RRC idle state to the RRC connected state. As a result, the transition between the RRC idle state to the RRC connected state may take more time and more exchanges of messages and/or signaling between the UE and the base station to complete. RRC inactive state is similar to RRC idle state in the sense that the UE does not have a connection with the network, but the UE retains its AS context in the RRC inactive state. The UE only needs to signal the network to resume the RRC connected state when the UE is ready to switch back from the RRC inactive state to the RRC connected state. The transition between RRC inactive state and RRC connected state may be faster than the transition between RRC idle state and RRC connected state, and may require less message or signaling exchange between the network and the UE, because both the network and the UE maintain the AS context of the UE. However, it may be more expensive for the network to store the AS context of the UE.

A UE may transition from RRC connected state to RRC idle state or RRC inactive state by signaling by the network or based on a timer. In signaling from the network, the network may send an RRC release message to the UE to transition to a different RRC state. However, this requires utilizing expensive messaging by the network. The UE, in response, releases its RRC bandwidth and AS context. In this RRC release message, the network may indicate to the UE whether it should switch to RRC inactive or RRC idle. In instances where the UE is to switch to RRC inactive, the release message may also contain the message SuspendConfig which contains the information needed by the UE to maintain its AS context during the inactive state. In instances where the UE transitions to RRC idle state or RRC inactive state based on a time, the UE is configured with the timer dataInactivityTimer which is set and reset by new data transmissions. When this timer expires, the UE enters RRC idle state. The timer based approach may be considered an implicit approach. In the timer based approach, the UE switches to RRC idle state.

There may be instances in which the UE may want to switch to the RRC idle state or to the RRC inactive state sooner than the expiration of the timer or without having to wait for the network to release the RRC connection. Allowing the UE to increase the rate at which it transitions to RRC idle state or RRC inactive state may allow the UE to reduce power consumption, as well as reduce signaling resources. For example, if the network and the UE do not expect the transmission and/or reception of additional data in the near future, the may have its RRC connection released or terminated in an effort to be more power efficient instead of having the UE waste power by maintaining the RRC connection and continue to monitor the RRC connection for data that is not expected to be sent or received. In addition, the UE should be configured to indicate its preferred RRC state for transitioning when the RRC connection is going to be released, either in response to signaling from the UE or response to a request from the UE. For example, if the UE predicts that it is likely that it will have more data, it is more efficient for the UE to switch to RRC inactive state instead of the RRC idle state. However, if the UE predicts that there will not be data for a long while, it is more sensible to switch to RRC idle state. Allowing the UE to indicate its preferred RRC state would allow the UE to assist the network in increasing the rate at which the UE changes state, which may reduce messaging overhead as well as reduce the UE's power consumption. A UE switching to the RRC idle state involves a considerable amount of signaling overhead and requires more resources, and if the UE has good confidence that there is more data coming in the near future, then it makes sense for the UE to switch to RRC inactive instead of RRC idle. The network may not be able to determine that the UE is going to have more data coming in the near future and may instruct the UE to switch to an RRC state that may not be the most optimal selection. As such, it would be useful for the UE to indicate to the network which RRC state is the preferred or optimal.

Figure 4:
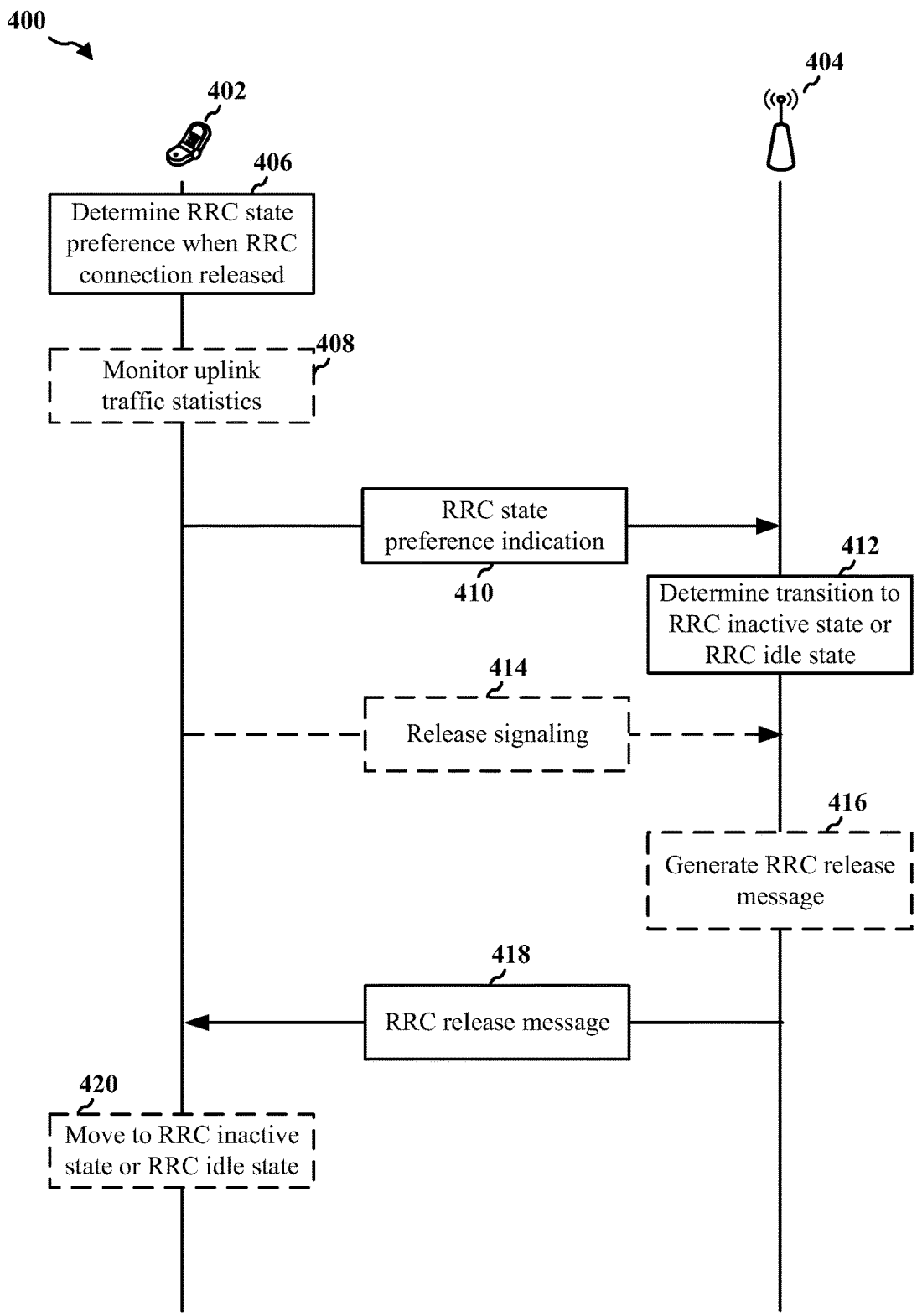
FIG. 4 is a call flow diagram of signaling between a UE and a base station in accordance with certain aspects of the disclosure.

FIG. 4 is a call flow diagram of signaling between a UE and a base station in accordance with certain aspects of the disclosure. The diagram 400 of FIG. 4 includes a UE 402 and a base station 404. The base station 404 may be configured to provide a cell. The UE 402 may be configured to communicate with the base station 404. For example, in the context of FIG. 1, the base station 404 may correspond 102/180 and, accordingly, the cell may include a geographic coverage area 110 in which communication coverage is provided and/or small cell 102' having a coverage area 110'. Further, a UE 402 may correspond to at least UE 104. In another example, in the context of FIG. 3, the base station 404 may correspond to base station 310 and the UE 402 may correspond to UE 350. Optional aspects are illustrated with a dashed line.

In some aspects, the UE 402 may be configured to assist the network in transitioning the UE to a different RRC state when releasing its RRC connection. The UE 402, at 406, may be configured to determine a preference between a transition to an RRC inactive state or to an RRC idle state. The UE may determine the preference for transitioning to the RRC inactive state or the RRC idle state when an RRC connection is released.

In some aspects, for example, at 408, the UE may monitor uplink traffic statistics. The uplink traffic statistics may be related to the occurrence or scheduling of uplink transmissions (e.g., average transmissions per time period, size of transmissions, recurrent or periodic occurrence of transmissions, or the like). The UE may know the type of traffic it may have, as such, the UE may have a good estimation of how likely the UE will have more data in the near future which would need to be transmitted in the uplink. The UE, in some aspects, may determine whether applications operating on the UE are expected to provide data that needs to be sent via uplink transmission to the network. In some aspects, the determination of the preference for the transition from the RRC connected state to one of the RRC inactive state or the RRC idle state may be based on the uplink traffic statistics. For example, in some aspects, when the UE determines that there is a good chance that the UE may have more uplink traffic, then the UE may determine a preference to transition to RRC inactive state. While in some aspects, when the UE determines that it may not have more uplink traffic, then the UE may determine a preference to transition to RRC idle state.

The UE may send an RRC state preference indication 410 to a base station 404. The RRC state preference indication may indicate the preference for transitioning upon release of the RRC connection from the RRC connected state to one of the RRC inactive state or the RRC idle state.

The base station 404 receives, from the UE 402, the RRC state preference indication 410. The RRC state preference indication 410 provides the base station 404 with the UE's preference for transitioning to a different RRC state when the RRC connection is release. In some aspects, the RRC state preference indication 410 may provide the base station with an indication for a transition from an RRC connected state to an RRC inactive state or to an RRC idle state when the RRC connection is released. In some aspects, the RRC state preference indication may be received, by the base station 404, in a UE assistance information (UAI) message. The UAI message may indicate whether the UE prefers the RRC state preference of RRC idle or RRC inactive when its RRC connection is released. The UE may send the UAI message having the RRC state preference any time it chooses, subject to a prohibit timer. For example, the UE may send the UAI message prior to the expiration of the prohibit timer for the UAI message. In some aspects, the RRC state preference indication may be received in a MAC-CE. In some aspects, the RRC state preference indication may be received as a BSR. For example, the UE 402 may be configured to generate a BSR where the RRC state preference indication is indicated in the BSR. In some aspects, the UE may generate one of a short BSR or a long BSR. The short or long BSR may be based on whether the RRC state preference indication is RRC inactive or RRC idle. In some aspects, the short BSR may correspond to the RRC inactive state, while the long BSR may correspond to the RRC idle state. In some aspects, the short BSR may correspond to the RRC idle state, while the long BSR may correspond to the RRC inactive state. In some aspects, the RRC state preference indication may be indicated in a field of the BSR. In some aspects, the BSR may comprise a zero-byte BSR, wherein the UE sends the zero-byte BSR to the base station, such that upon receipt of the zero-byte BSR, the base station may transition the UE to the preferred RRC state. In some aspects, a logical channel group (LCG) identifier (ID) in the short BSR may be used to indicate the preferred RRC state of the UE. For example, an LCG ID of 0 may correspond to RRC idle as the preferred RRC state, while an LCG ID of 1 may correspond to RRC inactive as the preferred RRC state.

At 412, the base station 404 may determine whether to transition the UE from the RRC connected state to the RRC inactive state or to the RRC idle state. The base station may determine whether to transition the UE from the RRC connected state to the RRC inactive state or RRC idle state based on the RRC state preference indication received from the UE.

In some aspects, for example, the UE 402 may be configured to send RRC release signaling 414 to the base station 404. The RRC release signaling sent to the base station may indicate a request, from the UE, to release the RRC connection. In some aspects, the RRC release signaling 414 may be sent separately from the RRC state preference indication 410. In some aspects, the RRC release signaling 414 may be sent as a BSR.

The base station 404, in some aspects, may generate, at 416, an RRC release message which indicates a transition from the RRC connected state to one of the RRC inactive state or the RRC idle state. The base station may generate the RRC release message based on the RRC state preference indication 410 received from the UE 402.

The base station 404 may send the RRC release message 418 to the UE 402. The RRC release message 418 may release the UE from the RRC connected state to one of the RRC inactive state or the RRC idle state. The UE 402 receives the RRC release message 418, from the base station 404, releasing the RRC connection. The RRC release message 418 may be based on the sent RRC state preference indication 410. In some aspects, the UE 402 may receive the RRC release message 418 in response to sending the RRC release signaling 414 to the base station 404. In such aspects, the RRC release message 418 may be based on the RRC state preference indication 410 sent to the base state 404 by the UE 402. The RRC release message 418 indicating whether the UE should transition from the RRC connected state to the RRC inactive state or from the RRC connected state to the RRC idle state.

The UE 402, at 420, may move or transition from the RRC connected state to one of the RRC inactive state or the RRC idle state. In some aspects, the UE 402 may move from the RRC connected state to one of the RRC inactive state or RRC idle state based on the RRC release message 418 received from the base station 404.

Figure 5:
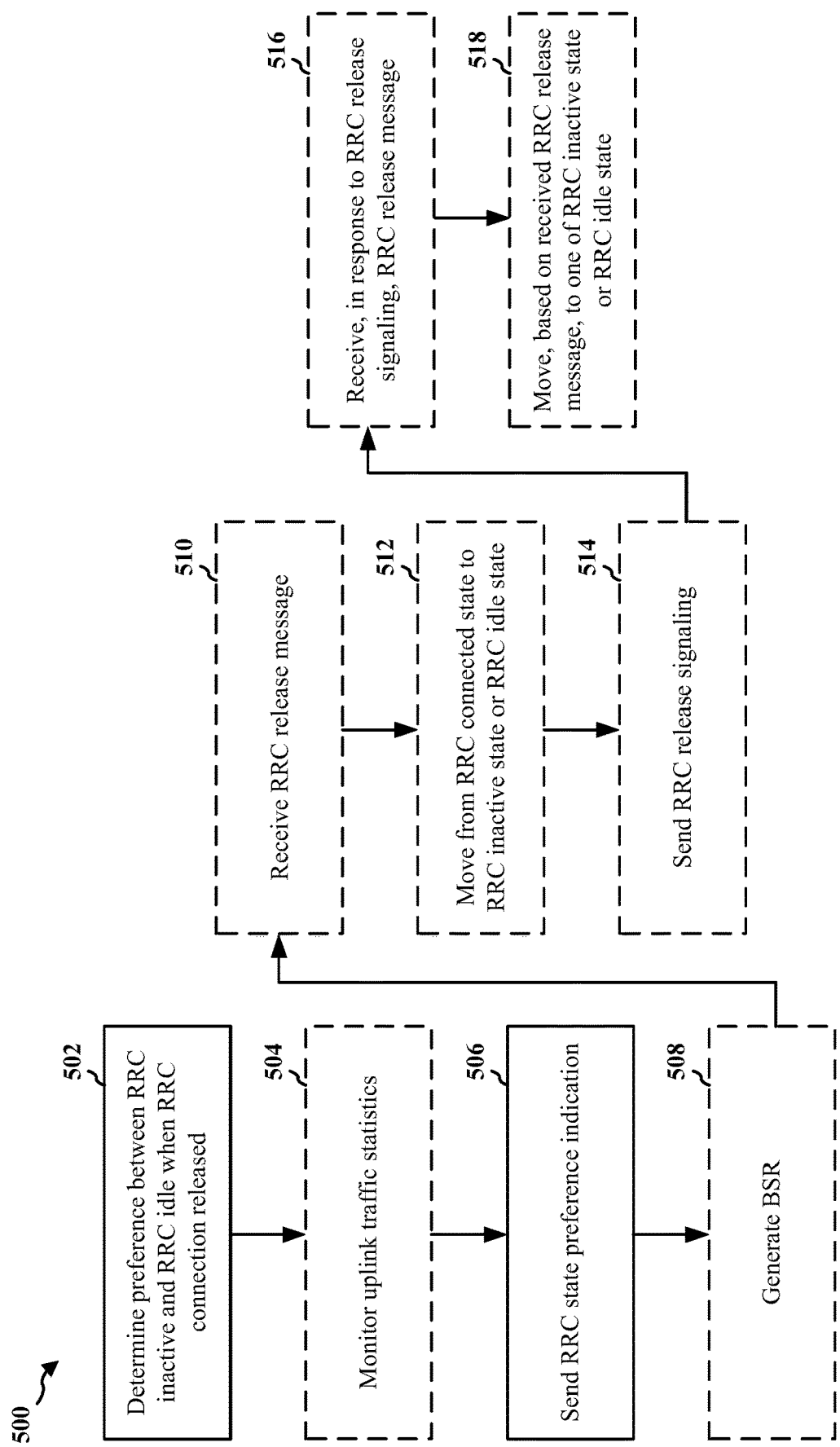
FIG. 5 is a flowchart of a method of wireless communication.

FIG. 5 is a flowchart 500 of a method of wireless communication. The method may be performed by a UE or a component of a UE (e.g., the UE 104, 350, 402; the apparatus 602; the cellular baseband processor 604, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. Optional aspects are illustrated with a dashed line. The method may allow a UE to assist the network in transitioning the UE to a preferred RRC state when releasing the RRC connection.

At 502, the UE may determine a preference between a transition to an RRC inactive state or to an RRC idle state. For example, 502 may be performed by preference component 640 of apparatus 602. The UE may determine the preference for transitioning to either the RRC inactive state or to the RRC idle state when an RRC connection is released.

At 504, the UE may monitor uplink traffic statistics. For example, 504 may be performed by monitor component 642 of apparatus 602. The determination of the preference for the transition from the RRC connected state to one of the RRC inactive state or the RRC idle state may be based on the uplink traffic statistics. The uplink traffic statistics may be related to the occurrence or scheduling of uplink transmissions (e.g., average transmissions per time period, size of transmissions, recurrent or periodic occurrence of transmissions, or the like). For example, in some aspects, when the UE determines that there is a good chance that the UE may have more uplink traffic, then the UE may determine a preference to transition to RRC inactive state. While in some aspects, when the UE determines that it may not have more uplink traffic, then the UE may determine a preference to transition to RRC idle state.

At 506, the UE may send an RRC state preference indication to a base station. For example, 506 may be performed by indication component 644 of apparatus 602. The RRC state preference indication may indicate the preference for transitioning upon release of the RRC connection from the RRC connected state to one of the RRC inactive state or the RRC idle state. In some aspects, the RRC state preference indication may be sent in a UE assistance information (UAI) message. The UAI message may indicate whether the UE prefers the RRC state preference of RRC idle or RRC inactive when its RRC connection is released. In some aspects, the UE may send the UAI having the RRC state preference any time it chooses, subject to a prohibit timer. For example, the UE may send the UAI message prior to the expiration of the prohibit timer for the UAI message. The RRC state preference may comprise RRC idle or RRC inactive. In some aspects, the RRC state preference indication may be sent in a MAC-CE. In some aspects, the RRC state preference may be sent as a buffer status report (BSR). In some aspects, the RRC state preference indication may be indicated in a field of the BSR.

At 508, the UE may generate a BSR where the RRC state preference indication is indicated in the BSR. For example, 508 may be performed by BSR component 646 of apparatus 602. In some aspects, the UE may generate one of a short BSR or a long BSR. The short or long BSR may be based on whether the RRC state preference indication is RRC inactive or RRC idle. In some aspects, the short BSR may correspond to the RRC inactive state, while the long BSR may correspond to the RRC idle state. In some aspects, the short BSR may correspond to the RRC idle state, while the long BSR may correspond to the RRC inactive state. In some aspects, the RRC state preference indication may be indicated in a field of the BSR. In some aspects, the BSR may comprise a zero-byte BSR, wherein the UE sends the zero-byte BSR to the base station, such that upon receipt of the zero-byte BSR, the base station may transition the UE to the preferred RRC state. In some aspects, a logical channel group (LCG) identifier (ID) in the short BSR may be used to indicate the preferred RRC state of the UE. For example, an LCG ID of 0 may correspond to RRC idle as the preferred RRC state, while an LCG ID of 1 may correspond to RRC inactive as the preferred RRC state.

At 510, the UE, in some aspects, may receive an RRC release message. For example, 510 may be performed by release component 648 of apparatus 602. The UE may receive the RRC release message from the base station. The RRC release message may release the RRC connection. In some aspects, the RRC release message may be based on the RRC state preference indication sent by the UE to the base station.

At 512, the UE may move or transition from the RRC connected state to one of the RRC inactive state or the RRC idle state. For example, 512 may be performed by move component 6650 of apparatus 602. In some aspects, the UE may move from the RRC connected state to one of the RRC inactive state or RRC idle state based on the RRC release message received from the base station.

At 514, the UE, in some aspects, may send RRC release signaling to the base station. For example, 514 may be performed by signaling component 652 of apparatus 602. The RRC release signaling sent to the base station may indicate a request, from the UE, to release the RRC connection. In some aspects, the RRC release signaling may be sent separately form the RRC state preference indication. In some aspects, the RRC release signaling may be sent as a BSR.

At 516, the UE, may receive an RRC release message releasing the RRC connection. For example, 516 may be performed by RRC release component 654 of apparatus 602. The RRC release message may be received from the base station in response to the RRC release signaling sent by the UE. The RRC release message may be based on the sent RRC state preference indication. In some aspects, the RRC release message may indicate whether the UE should transition from the RRC connected state to the RRC inactive state. In some aspects, the RRC release message may indicate whether the UE should transition from the RRC connected state to the RRC idle state.

At 518, the UE may move from the RRC connected state to one of the RRC inactive state or the RRC idle state. For example, 518 may be performed by move component 650 of apparatus 602. In some aspects, the UE may move from the RRC connected state to one of the RRC inactive state or the RRC idle state based on the RRC release message received from the base station.

Figure 6:
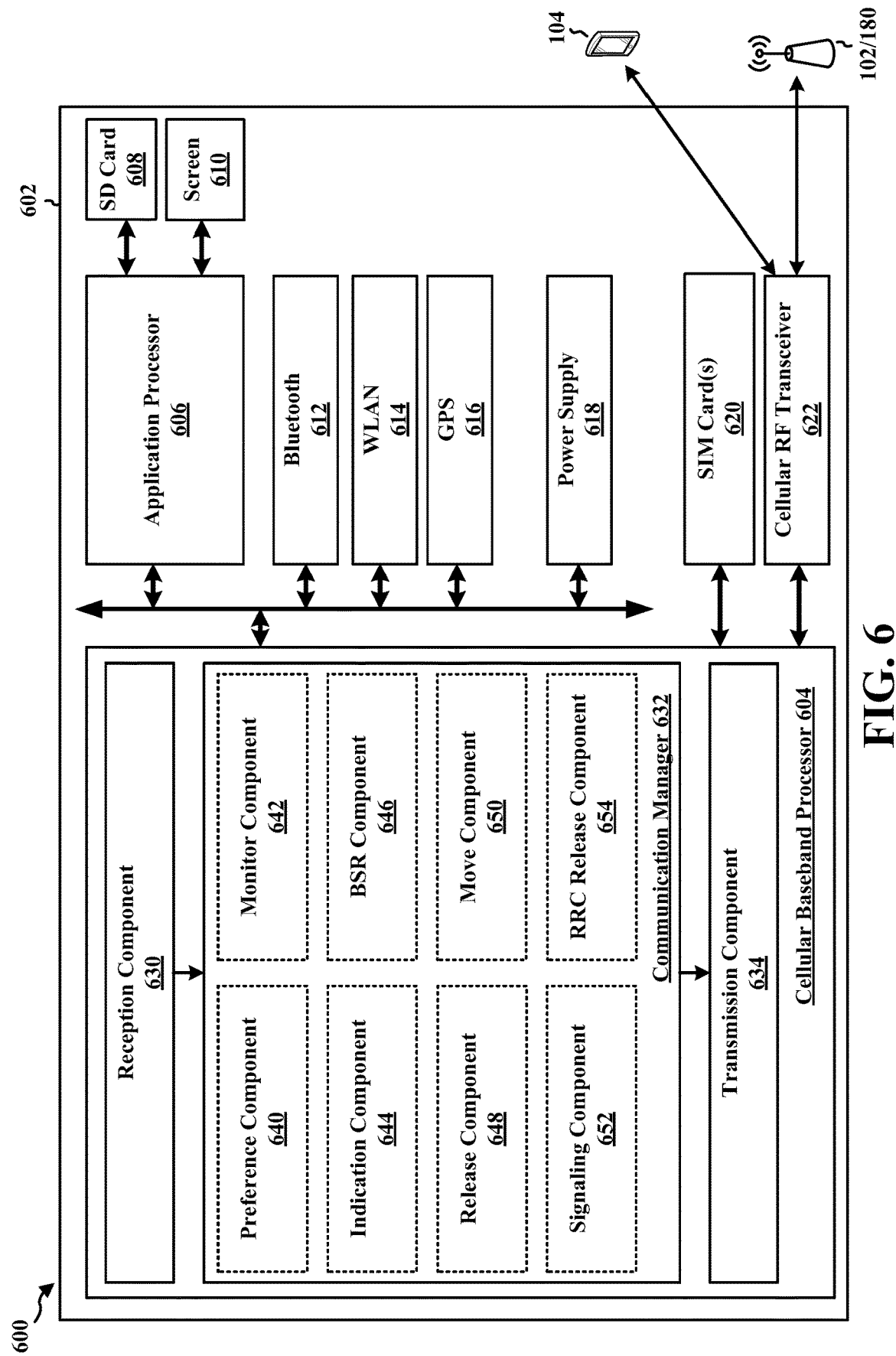
FIG. 6 is a diagram illustrating an example of a hardware implementation for an apparatus employing a processing system.

FIG. 6 is a diagram 600 illustrating an example of a hardware implementation for an apparatus 602. The apparatus 602 is a UE and includes a cellular baseband processor 604 (also referred to as a modem) coupled to a cellular RF transceiver 622 and one or more subscriber identity modules (SIM) cards 620, an application processor 606 coupled to a secure digital (SD) card 608 and a screen 610, a Bluetooth module 612, a wireless local area network (WLAN) module 614, a Global Positioning System (GPS) module 616, and a power supply 618. The cellular baseband processor 604 communicates through the cellular RF transceiver 622 with the UE 104 and/or BS 102/180. The cellular baseband processor 604 may include a computer-readable medium/memory. The computer-readable medium/memory may be non-transitory. The cellular baseband processor 604 is responsible for general processing, including the execution of software stored on the computer-readable medium/memory. The software, when executed by the cellular baseband processor 604, causes the cellular baseband processor 604 to perform the various functions described supra. The computer-readable medium/memory may also be used for storing data that is manipulated by the cellular baseband processor 604 when executing software. The cellular baseband processor 604 further includes a reception component 630, a communication manager 632, and a transmission component 634. The communication manager 632 includes the one or more illustrated components. The components within the communication manager 632 may be stored in the computer-readable medium/memory and/or configured as hardware within the cellular baseband processor 604. The cellular baseband processor 604 may be a component of the UE 350 and may include the memory 360 and/or at least one of the TX processor 368, the RX processor 356, and the controller/processor 359. In one configuration, the apparatus 602 may be a modem chip and include just the baseband processor 604, and in another configuration, the apparatus 602 may be the entire UE (e.g., see 350 of FIG. 3) and include the aforediscussed additional modules of the apparatus 602.

The communication manager 632 includes a preference component 640 that is configured to determine a preference between a transition to an RRC inactive state or to an RRC idle state when an RRC connection is released, e.g., as described in connection with 502 of FIG. 5. The communication manager 632 further includes a monitor component 642 that is configured to monitor uplink traffic statistics, e.g., as described in connection with 504 of FIG. 5. The communication manager 632 further includes an indication component 644 that is configured to send an RRC state preference indication to a base station, e.g., as described in connection with 506 of FIG. 5. The communication manager 632 further includes a BSR component 646 that is configured to generate a BSR where the RRC state preference indication is indicated in the BSR, e.g., as described in connection with 508 of FIG. 5. The communication manger 632 further includes a release component 648 that is configured to may receive an RRC release message releasing the RRC connection, e.g., as described in connection with 510 of FIG. 5. The communication manager 632 further includes a move component 650 that is configured to move or transition the UE from the RRC connected state to one of the RRC inactive state or the RRC idle state, e.g., as described in connection with 512 of FIG. 5. The move component 650 may be configured to move or transition the UE from the RRC connected state to one of the RRC inactive state or RRC idle state based on the RRC release message received from the base station, e.g., as described in connection with 518 of FIG. 5. The communication manager 632 further includes a signaling component 652 that is configured to send RRC release signaling to the base station indicating a request to release the RRC connection, e.g., as described in connection with 514 of FIG. 5. The communication manager 632 further includes an RRC release component 654 that is configured to receive an RRC release message releasing the RRC connection from the base station in response to the RRC release signaling, e.g., as described in connection with 516 of FIG. 5.

The apparatus may include additional components that perform each of the blocks of the algorithm in the aforementioned flowchart of FIG. 5. As such, each block in the aforementioned flowchart of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 602, and in particular the cellular baseband processor 604, includes means for determining a preference between a transition to an RRC inactive state or to an RRC idle state when an RRC connection is released. The apparatus includes means for sending to a base station an RRC state preference indication of the preference for transitioning upon release of the RRC connection from the RRC connected state to one of the RRC inactive state or to the RRC idle state. The apparatus further includes means for monitoring uplink traffic statistics. The determination of the preference for transitioning from the RRC connected state to one of the RRC inactive state or the RRC idle state based on the uplink traffic statistics. The apparatus further includes means for receiving, from the base station, an RRC release message releasing the RRC connection. The RRC release message based on the sent RRC state preference indication. The apparatus further includes means for moving, based on the received RRC release message, from the RRC connected state to one of the RRC inactive state or the RRC idle state. The apparatus further includes means for sending to the base station RRC release signaling indicating a request to release the RRC connection. The apparatus further includes means for receiving, from the base station in response to the RRC release signaling, an RRC release message releasing the RRC connection. The RRC release message based on the sent RRC state preference indication. The RRC release message indicating whether the UE should transition from the RRC connected state to the RRC inactive state or from the RRC connected state to the RRC idle state. The apparatus further includes means for moving, based on the received RRC release message, from the RRC connected state to one of the RRC inactive state or the RRC idle state. The apparatus further includes means for generating one of a short BSR or a long BSR based on whether the RRC state preference indication is RRC inactive or RRC idle. The RRC state preference indication indicated in the BSR through sending one of the short BSR or a long BSR. The aforementioned means may be one or more of the aforementioned components of the apparatus 602 configured to perform the functions recited by the aforementioned means. As described supra, the apparatus 602 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 7:
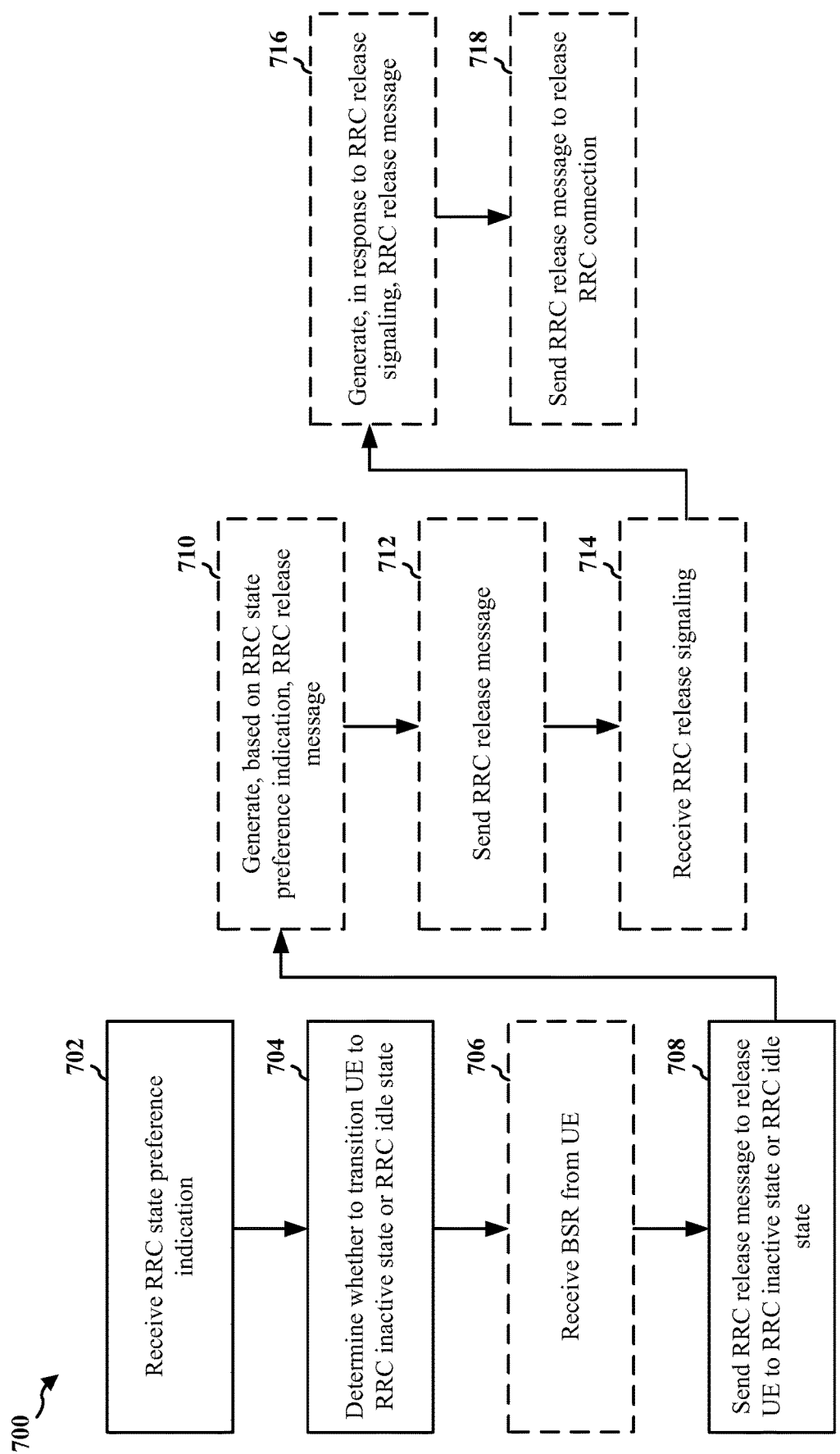
FIG. 7 is a flowchart of a method of wireless communication.

FIG. 7 is a flowchart 700 of a method of wireless communication. The method may be performed by a base station or a component of a base station (e.g., the base station 102, 180, 310, 404; the apparatus 802; the baseband unit 804, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. Optional aspects are illustrated with a dashed line. The method may allow a base station to reduce signaling overhead when instructing a UE to transition to a different RRC state from an RRC connected state.

At 702, the base station may receive an RRC state preference indication for a transition from an RRC connected state to an RRC inactive state or to an RRC idle state when the RRC connection is released. For example, 702 may be performed by preference component 840 of apparatus 802. The base station may receive the RRC state preference indication from a UE. In some aspects, the RRC state preference indication may be received in a UAI message. In some aspects, the base station receives the UAI message in response to a connection release message sent from the base station. In some aspects, the RRC state preference indication may be received in a MAC-CE. In some aspects, the RRC state preference indication may be received as a BSR.

At 704, the base station may determine whether to transition the UE from the RRC connected state to the RRC inactive state or to the RRC idle state. For example, 704 may be performed by transition component 842 of apparatus 802. The base station may determine whether to transition the UE from the RRC connected state to the RRC inactive state or RRC idle state based on the RRC state preference indication received from the UE.

At 706, the base station, in some aspects, may receive a BSR from the UE. For example, 706 may be performed by BSR component 844 of apparatus 802. In some aspects, the BSR may comprise one of a short BSR or a long BSR. The short or long BSR may be based on whether the RRC state preference indication corresponds to the RRC inactive state or the RRC idle state. The RRC state preference indication may be indicated in the BSR, based on whether the short BSR or the long BSR is received. In some aspects, the short BSR may correspond to the RRC inactive state, while the long BSR may correspond to the RRC idle state. In some aspects, the short BSR may correspond to the RRC idle state, while the long BSR may correspond to the RRC inactive state.

At 708, the base station may send an RRC release message to the UE. For example, 708 may be performed by RRC release component 846 of apparatus 802. The RRC release message may release the UE from the RRC connected state to one of the RRC inactive state or the RRC idle state.

At 710, the base station, in some aspects, may generate the RRC release message which indicates a transition from the RRC connected state to one of the RRC inactive state or the RRC idle state. For example, 710 may be performed by generation component 848 of apparatus 802. The base station may generate the RRC release message based on the RRC state preference indication received from the UE.

At 712, the base station may send the RRC release message to the UE. For example, 712 may be performed by message component 850 of apparatus 802. The RRC release message may release the RRC connection.

At 714, the base station, in some aspects, may receive RRC release signaling from the UE. For example, 714 may be performed by signaling component 852 of apparatus 802. The RRC release signaling may indicate a request, from the UE, to release the RRC connection. In some aspects, the RRC release signaling may be received separately from the RRC state preference indication. In some aspects, the RRC release signaling may be received as a BSR.

At 716, the base station, in some aspects, may generate an RRC release message releasing the RRC connection. For example, 716 may be performed by generation component 848 of apparatus 802. In some aspects, the RRC release message may be generated in response to the RRC release signaling from the UE. The RRC release message may be based on the received RRC state preference indication. The RRC release message may indicate whether the UE transitions from the RRC connected state to the RRC inactive state or from the RRC connected state to the RRC idle state.

At 718, the base station may send the RRC release message to the UE. For example, 718 may be performed by release component 854 of apparatus 802. In some aspects, the RRC release message releases the RRC connection of the UE. The RRC release message is sent to the UE in response to the UE requesting a release of its RRC connection in the RRC release signaling.

FIG. 8 is a diagram 800 illustrating an example of a hardware implementation for an apparatus 802. The apparatus 802 is a BS and includes a baseband unit 804. The baseband unit 804 may communicate through a cellular RF transceiver with the UE 104. The baseband unit 804 may include a computer-readable medium/memory. The baseband unit 804 is responsible for general processing, including the execution of software stored on the computer-readable medium/memory. The software, when executed by the baseband unit 804, causes the baseband unit 804 to perform the various functions described supra. The computer-readable medium/memory may also be used for storing data that is manipulated by the baseband unit 804 when executing software. The baseband unit 804 further includes a reception component 830, a communication manager 832, and a transmission component 834. The communication manager 832 includes the one or more illustrated components. The components within the communication manager 832 may be stored in the computer-readable medium/memory and/or configured as hardware within the baseband unit 804. The baseband unit 804 may be a component of the BS 310 and may include the memory 376 and/or at least one of the TX processor 316, the RX processor 370, and the controller/processor 375.

The communication manager 832 includes a preference component 840 that is configured to receive an RRC state preference indication, from the UE, for a transition from an RRC connected state to an RRC inactive state or to an RRC idle state when the RRC connection is released, e.g., as described in connection with 702 of FIG. 7. The communication manager 832 further includes a transition component 842 that is configured to determine whether to transition the UE from the RRC connected state to the RRC inactive state or the RRC idle state, e.g., as described in connection with 704 of FIG. 7. The communication manager 832 further includes a BSR component 844 that is configured to receive a BSR where the RRC state preference indication is indicated in the BSR, e.g., as described in connection with 706 of FIG. 7. The communication manager 832 further includes an RRC release component 846 that is configured to send the RRC release message to the UE to release the UE from the RRC connected state to one of the RRC inactive state or the RRC idle state, e.g., as described in connection with 708 of FIG. 7. The communication manager 832 further includes a generation component 848 that is configured to generate, based on the received RRC state preference indication, an RRC release message indicating a transition from the RRC connected state to one of the RRC inactive state or the RRC idle state, e.g., as described in connection with 710 of FIG. 7. The generation component 848 may be configured to generate, in response to the RRC release signaling, an RRC release message releasing the RRC connection, e.g., as described in connection with 716 of FIG. 7. The communication manager 832 further includes a message component 850 configured to send the RRC release message to the UE releasing the RRC connection, e.g., as described in connection with 712 of FIG. 7. The communication manager 832 further includes a signaling component 852 configured to receive, from the UE, RRC release signaling indicating a request to release the RRC connection, e.g., as described in connection with 714 of FIG. 7. The communication manager 832 further includes a release component 854 configured to send, to the UE, the RRC release message releasing the RRC connection, e.g., as described in connection with 718 of FIG. 7.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the baseband unit 804, includes means for receiving, from a UE, an RRC state preference indication for a transition from an RRC connected state to an RRC inactive state or to an RRC idle state when the RRC connection is released. The apparatus includes means for determining, based on the received RRC state preference indication, whether to transition the UE from the RRC connected state to the RRC inactive state or to the RRC idle state. The apparatus includes means for sending an RRC release message to the UE to release the UE from the RRC connected state to one of the RRC inactive state or the RRC idle state. The apparatus further includes means for generating, based on the received RRC state preference indication, the RRC release message indicating a transition from the RRC connected state to one of the RRC inactive state or the RRC idle state. The apparatus further includes means for sending, to the UE, the RRC release message releasing the RRC connection. The apparatus further includes means for receiving from the UE RRC release signaling indicating a request to release the RRC connection. The apparatus further includes means for generating, in response to the RRC release signaling, an RRC release message releasing the RRC connection. The RRC release message being based on the received RRC state preference indication. The RRC release message indicating whether the UE should transition from the RRC connected state to the RRC inactive state or from the RRC connected state to the RRC idle state. The apparatus further includes means for sending, to the UE, the RRC release message releasing the RRC connection. The apparatus further includes means for receiving, from the UE, one of a short BSR or a long BSR based on whether the RRC state preference indication is RRC inactive or RRC idle. The RRC state preference indication indicated in the BSR by receiving one of the short BSR or a long BSR. The aforementioned means may be one or more of the aforementioned components of the apparatus 802 configured to perform the functions recited by the aforementioned means. As described supra, the apparatus 802 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The present disclosure allows a UE to assist in its transition to a different RRC state when the RRC connection is released, such that the UE may optimize their transition from RRC connected to either the RRC idle state or RRC inactive state, which may reduce the amount of resources that the base station needs to release the RRC connection. The UE may indicate to the base station its preferred RRC state to transition to when releasing the RRC connection, which may reduce the power consumption of the UE. At least one advantage of the disclosure is that the UE may indicate a preferred RRC state to the network which allows the network to reduce the signaling overhead while switching the RRC state.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teaching described herein, without limitation.

Example 1 is method of wireless communication at a UE, comprising determining a preference between a transition to an RRC inactive state or to an RRC idle state when an RRC connection is released; and sending to a base station an RRC state preference indication of the preference for transitioning upon release of the RRC connection from the RRC connected state to one of the RRC inactive state or to the RRC idle state.

In Example 2, the method of Example 1 further includes monitoring uplink traffic statistics, wherein the determination of the preference for transitioning from the RRC connected state to one of the RRC inactive state or the RRC idle state is based on the uplink traffic statistics.

In Example 3, the method of Example 1 or 2 further includes receiving, from the base station, an RRC release message releasing the RRC connection, the RRC release message being based on the sent RRC state preference indication; and moving, based on the received RRC release message, from the RRC connected state to one of the RRC inactive state or the RRC idle state.

In Example 4, the method of any of Examples 1-3 further includes sending to the base station RRC release signaling indicating a request to release the RRC connection.

In Example 5, the method of any of Examples 1-4 further includes receiving, from the base station in response to the RRC release signaling, an RRC release message releasing the RRC connection, the RRC release message being based on the sent RRC state preference indication, the RRC release message indicating whether the UE should transition from the RRC connected state to the RRC inactive state or from the RRC connected state to the RRC idle state; and moving, based on the received RRC release message, from the RRC connected state to one of the RRC inactive state or the RRC idle state.

In Example 6, the method of any of Examples 1-5 further includes that the RRC release signaling is sent separately from the RRC state preference indication.

In Example 7, the method of any of Examples 1-6 further includes that the RRC release signaling is sent as a BSR.

In Example 8, the method of any of Examples 1-7 further includes that the RRC state preference indication is sent in a UAI message.

In Example 9, the method of any of Examples 1-8 further includes that the RRC state preference comprises RRC idle or RRC inactive.

In Example 10, the method of any of Examples 1-9 further includes that the UAI message is sent subject to a prohibit timer.

In Example 11, the method of any of Examples 1-10 further includes that the RRC state preference indication is sent in a MAC CE.

In Example 12, the method of any of Examples 1-11 further includes that wherein the RRC state preference indication is sent as a BSR.

In Example 13, the method of any of Examples 1-12 further includes generating one of a short BSR or a long BSR based on whether the RRC state preference indication is RRC inactive or RRC idle, wherein the RRC state preference indication is indicated in the BSR through sending one of the short BSR or a long BSR.

In Example 14, the method of any of Examples 1-13 further includes that the RRC state preference indication is indicated in a field of the BSR.

Example 15 is a device including one or more processors and one or more memories in electronic communication with the one or more processors storing instructions executable by the one or more processors to cause the system or apparatus to implement a method as in any of Examples 1-14.

Example 16 is a system or apparatus including means for implementing a method or realizing an apparatus as in any of Examples 1-14.

Example 17 is a non-transitory computer readable medium storing instructions executable by one or more processors to cause the one or more processors to implement a method as in any of Examples 1-14.

Example 18 is a method of wireless communication at a base station comprising receiving, from a user equipment (UE), an RRC state preference indication for a transition from an RRC connected state to an RRC inactive state or to an RRC idle state when the RRC connection is released; determining, based on the received RRC state preference indication, whether to transition the UE from the RRC connected state to the RRC inactive state or to the RRC idle state; and sending an RRC release message to the UE to release the UE from the RRC connected state to one of the RRC inactive state or the RRC idle state.

Example 19 is a device including one or more processors and one or more memories in electronic communication with the one or more processors storing instructions executable by the one or more processors to cause the system or apparatus to implement a method as in Example 18.

Example 20 is a system or apparatus including means for implementing a method or realizing an apparatus as in Example 18.

Example 21 is a non-transitory computer readable medium storing instructions executable by one or more processors to cause the one or more processors to implement a method as in Example 18.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication performed by a user equipment (UE), comprising:
  receiving, from a network entity, a configuration that configures the UE to: (i) select a radio resource control (RRC) state preference from among an RRC inactive state and an RRC idle state, the RRC state preference indicating a preference of the UE to transition out of an RRC connected state into one of the RRC inactive state or the RRC idle state, and (ii) report UE assistance information to inform the network entity of the RRC state preference selected by the UE;
  generating one of a short buffer status report (BSR) or a long BSR based on whether the RRC state preference is RRC inactive or RRC idle;
  sending, to the network entity, one of the short BSR or the long BSR indicating the RRC state preference; and receiving, from the network entity, an RRC release message releasing an RRC connection between the UE and the network entity, the RRC release message indicating whether the UE is to transition from the RRC connected state to the RRC inactive state or from the RRC connected state to the RRC idle state based on the RRC state preference selected by the UE.

2. The method of claim 1, further comprising:
monitoring uplink traffic statistics indicative one or more of an occurrence of an uplink transmission per time period or a scheduling of an uplink transmission per time period, wherein the indication of the RRC state preference is based on the uplink traffic statistics.

3. The method of claim 1, further comprising:
sending, to the network entity, RRC release signaling indicating a request to release the RRC connection based on the RRC state preference, wherein the RRC release signaling is sent prior to receiving the RRC release message and is sent separately from the indication of the RRC state preference; and
transitioning, based on the received RRC release message, from the RRC connected state to one of the RRC inactive state or the RRC idle state.

4. The method of claim 1, further comprising:
sending, to the network entity, RRC release signaling indicating a request to release the RRC connection based on the RRC state preference, wherein the RRC release signaling is sent prior to receiving the RRC release message and is sent separately from the indication of the RRC state preference;
receiving, in response to the RRC release signaling, the RRC release message releasing the RRC connection, the RRC release message being based on the RRC state preference; and
transitioning, based on the RRC release message, from the RRC connected state to one of the RRC inactive state or the RRC idle state.

5. The method of claim 4, wherein the RRC release signaling is sent as a buffer status report (BSR).

6. The method of claim 1, wherein the indication of the RRC state preference is sent in a UE assistance information (UAI) message.

7. The method of claim 6, wherein the UAI message is sent subject to a prohibit timer.

8. The method of claim 1, wherein the indication of the RRC state preference is sent in a media access control (MAC) control element (CE).

9. The method of claim 1, wherein the RRC state preference is indicated in a field of the BSR.

10. An apparatus for wireless communication at a user equipment (UE), comprising:
a memory; and
at least one processor coupled to the memory and configured to:
receive, from a network entity, a configuration that configures the UE to: (i) select a radio resource control (RRC) state preference from among an RRC inactive state and an RRC idle state, the RRC state preference indicating a preference of the UE to transition out of an RRC connected state into one of the RRC inactive state or the RRC idle state, and (ii) report UE assistance information to inform the network entity of the RRC state preference selected by the UE;
generate one of a short buffer status report (BSR) or a long BSR based on whether the RRC state preference is RRC inactive or RRC idle;
send, to the network entity, one of the short BSR or the long BSR indicating the RRC state preference; and
receive, from the network entity, an RRC release message releasing an RRC connection between the UE and the network entity, the RRC release message indicating whether the UE is to transition from the RRC connected state to the RRC inactive state or from the RRC connected state to the RRC idle state based on the RRC state preference selected by the UE.

11. The apparatus of claim 10, wherein the at least one processor further configured to:
monitor uplink traffic statistics indicative one or more of an occurrence of an uplink transmission per time period or a scheduling of an uplink transmission per time period, wherein the indication of the RRC state preference is based on the uplink traffic statistics.

12. The apparatus of claim 10, wherein the at least one processor further configured to:
transition, based on the received RRC release message, from the RRC connected state to one of the RRC inactive state or the RRC idle state.

13. The apparatus of claim 10, wherein the at least one processor further configured to:
send, to the network entity, RRC release signaling indicating a request to release the RRC connection based on the RRC state preference, wherein the RRC release signaling is sent prior to receiving the RRC release message from the network entity and is sent separately from the indication of the RRC state preference;
receive, in response to the RRC release signaling, the RRC release message releasing the RRC connection, the RRC release message being based on the sent indication of the RRC state preference; and
transition, based on the RRC release message, from the RRC connected state to one of the RRC inactive state or the RRC idle state.

14. The apparatus of claim 13, wherein the RRC release signaling is sent as a buffer status report (BSR).

15. The apparatus of claim 10, wherein the indication of the RRC state preference is sent in a UE assistance information (UAI) message.

16. The apparatus of claim 15, wherein the UAI message is sent subject to a prohibit timer.

17. The apparatus of claim 10, wherein the indication of the RRC state preference is sent in a media access control (MAC) control element (CE).

18. The apparatus of claim 10, wherein the RRC state preference is indicated in a field of the BSR.

19. A method of wireless communication at a network entity, comprising:
sending, to a user equipment (UE), a configuration that configures the UE to: (i) select a radio resource control (RRC) state preference from among an RRC inactive state and an RRC idle state, the RRC state preference indicating a preference of the UE to transition out of an RRC connected state into one of the RRC inactive state or the RRC idle state, and (ii) report UE assistance information to inform the network entity of the RRC state preference selected by the UE;
receiving, from the UE, one of a short buffer status report (BSR) or a long BSR indicating the RRC state preference; and
sending, to the UE, an RRC release message to release the UE from an RRC connected state to one of the RRC inactive state or the RRC idle state based on the RRC state preference selected by the UE.

20. An apparatus for wireless communication at a network entity, comprising:
a memory; and
at least one processor coupled to the memory and configured to:
send, to a user equipment (UE), a configuration that configures the UE to: (i) select a radio resource control (RRC) state preference from among an RRC inactive state and an RRC idle state, the RRC state preference indicating a preference of the UE to transition out of an RRC connected state into one of the RRC inactive state or the RRC idle state, and (ii) report UE assistance information to inform the network entity of the RRC state preference selected by the UE;
receive, from the UE, one of a short buffer status report (BSR) or a long BSR indicating the RRC state preference; and
send, to the UE, an RRC release message to release the UE from an RRC connected state to one of the RRC inactive state or the RRC idle state based on the RRC state preference selected by the UE.

\* \* \* \* \*